United States Patent Office 2,701,496
Patented Feb. 8, 1955

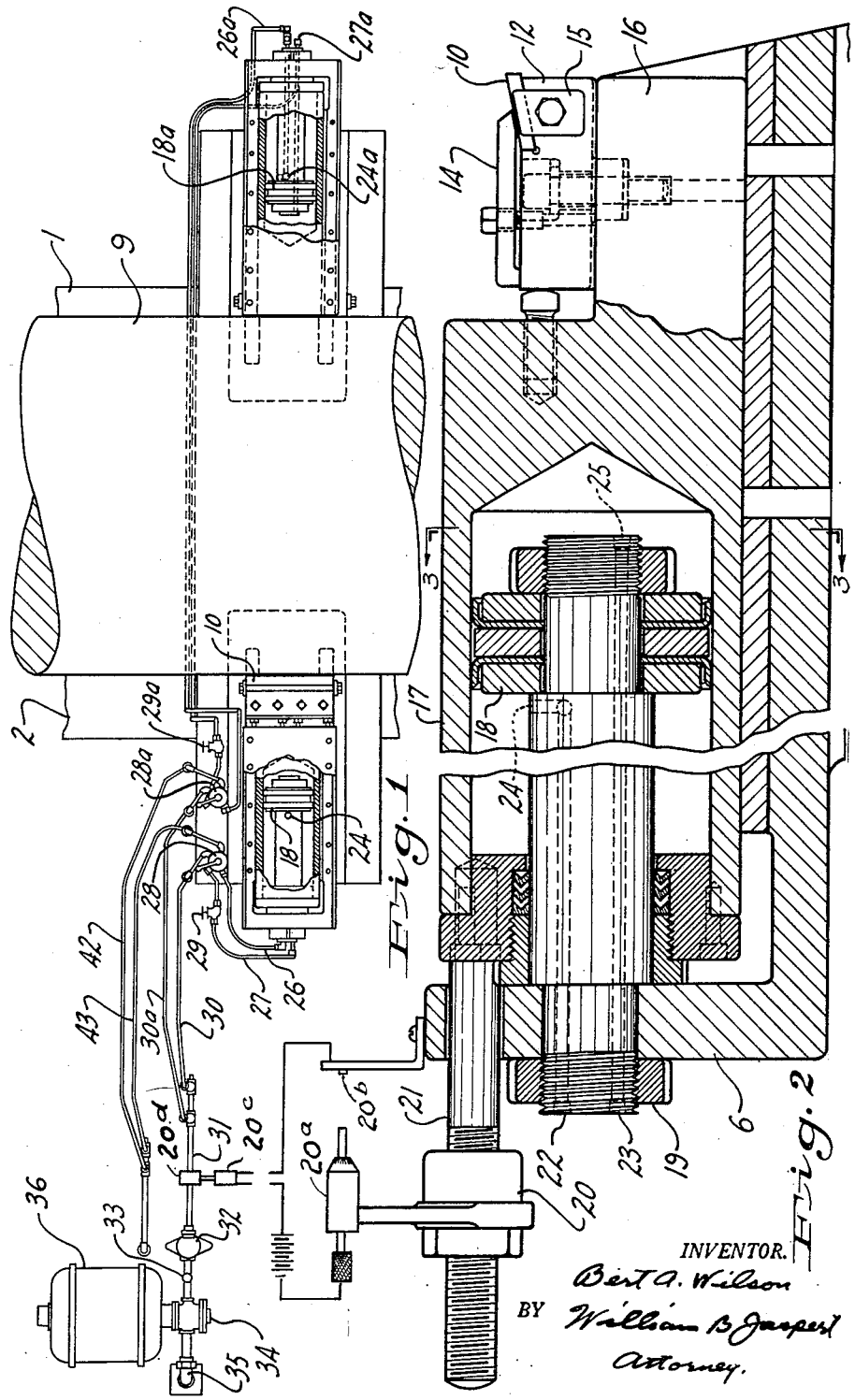

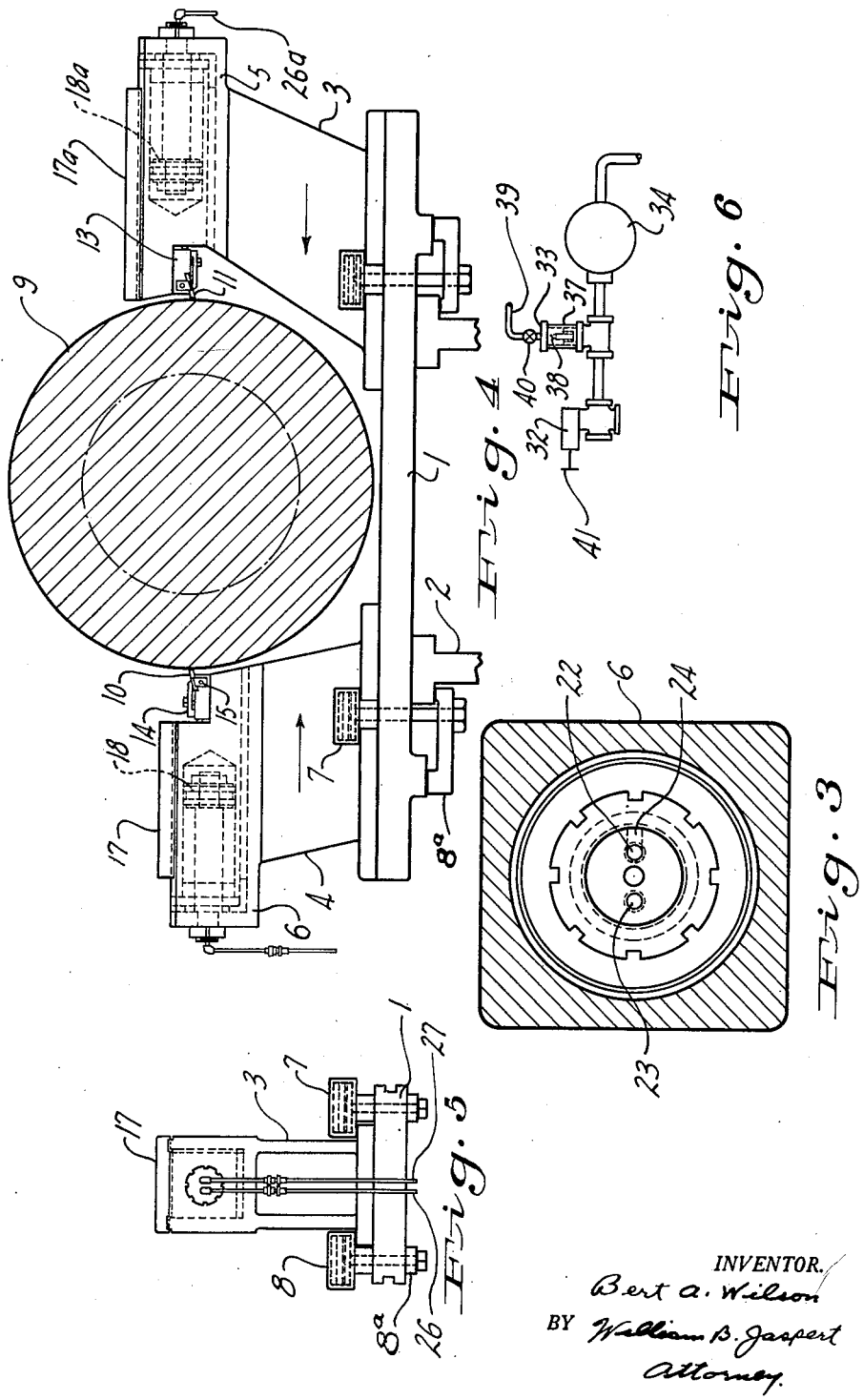

2,701,496

HYDRAULIC FEED MECHANISM

Bert A. Wilson, Pittsburgh, Pa., assignor, by mesne assignments, to Blaw-Knox Company, Pittsburgh, Pa., a corporation of Delaware Application August 24, 1949, Serial No. 112,125

1 Claim. (Cl. 82—25)

This invention relates to new and useful improvements in hydraulic feed mechanisms for lathe turning tools or the like, and the present invention is a continuation-in-part of an application, Serial No. 51,225, filed September 25, 1948.

In the aforementioned application is described hydraulic feed means for lathe turning tools in which the cutting tool is fed into the work by pressure fluid, controlled to maintain a predetermined uniform rate of feed, at predetermined feeding pressures independently of the pressure of the fluid at its source.

In accordance with the present invention, the hydraulic feed principle is applied to simultaneously or independently feed a plurality of cutting tools with control means for maintaining equal feeding pressure on the cutting edge of the plurality of tools, whereby the feeding pressures on the stock to be turned may be applied in opposite directions to balance against the work without the application of bearing stresses on the work journals or centers.

The invention will become more apparent from a consideration of the accompanying drawings, constituting a part hereof, in which like reference characters designate like parts, and in which:

Fig. 1 is a top plan view, partially in section, of hydraulic feed lathe turning cutting mechanism embodying the principles of this invention;

Fig. 2 a cross sectional view of one of the tool posts and slides;

Fig. 3 a cross section taken along the line 3—3, Fig. 2;

Fig. 4 an end elevational view, partially in section, of the feed mechanism shown in Fig. 1;

Fig. 5 a front elevational view of a tool post and slide; and

Fig. 6 a diagrammatic view of a portion of the pressure fluid control mechanism.

With reference to the several figures of the drawings, numeral 1 designates a slide mounted on a bed 2 on which are mounted necking rests 3 and 4 which carry the tool post slides 5 and 6, respectively. The necking rests 3 and 4 are slidable on the member 1 and are secured thereto by bolts (not shown). Base 1 is clamped to bed 2 by hydraulic cylinders 7 and 8 which actuate the clamps 8a.

Steel mill rolls, such as the roll 9, are cast of steel or cast iron, or sometimes alloys, which in any case are subjected to machining operations on the roll faces and roll journals preliminary to grinding. The machining operation requires the removal of substantial amounts of stock from the roll which requires considerable time and reduces the capacity of the turning lathe. By means of the hydraulic feed mechanism described in my above-mentioned copending application, heavy duty cutting tools can be rapidly fed into tough steel rolls.

The present invention utilizes that principle to further speed up the cutting operation and thereby give greater capacity to the turning lathe equipment by employing a plurality of cutting tools, designated by numerals 10 and 11, disposed at opposite sides of the roll 9, that are clamped on the tool rests 12 and 13 by clamps 14 and 15, the tool rests being clamped to the tool stocks 16 mounted on the slides 5 and 6. As more clearly shown in Fig. 2 of the drawings, the tool stocks 16 are provided with cylinders 17 in which are disposed pistons 18, the pistons being secured to the slides 5 and 6 and secured by screw nuts 19. An adjustable stop nut 20 on screw 21 determines the travel of the tool stock. Nut 20 may also be employed for hand feeding under pressure of fluid for rounding up work. It also functions as an adjustable feed stop by mounting a micrometer 20a thereon which contacts a terminal 20b of an electrical circuit that energizes a solenoid 20c for actuating a shut-off valve 20d in the main fluid supply line 31.

The tool stocks 16 are hydraulically operated by means of pressure fluid delivered through the glands shown in dotted lines in Fig. 2 and designated by the reference characters 22 and 23. The gland 22 communicates with a drill hole 24 on one side of the piston element 18, and the gland 23 extends to the opening 25 at the other side of the piston 18. Pressure fluid is maintained on both sides of the piston 18, and by increasing the pressure on one side, or decreasing the pressure on one side of the piston, the tool post 16 is subjected to movement relative to the piston to feed the cutting tool 10 into the work in the manner shown in Fig. 4.

The hydraulic system connecting the movable tool posts on opposite sides of the turning lathe is shown in Fig. 1 of the drawings, in which glands 22 and 23 are shown connected to conduits 26 and 27 and to conduits 26a and 27a. Each operating cylinder is connected to a four-way valve 28 and 28a, the conduits 27 and 27a being provided with needle valves 29 and 29a. Each of the four-way valves 28 and 28a is connected to pressure lines 30 and 30a having a common conduit connection 31 with a relief valve 32, an air bleeder 33, and an hydraulic pump 34 having a connection 35 leading to a sump or storage tank. The pump 34 is driven by a motor 36 and, as shown in Fig. 6, the air bleeder 33 consists of a chamber having a float 37 with a needle valve 38 that permits any air entrapped in the fluid flowing from the pump to separate and pass upward to a vent 39 which is provided with a valve 40 for opening and closing the vent. The float 37 is grooved to permit air to pass therearound, and when the air pressure above the float displaces the float 37 it opens the needle valve 38 and air flows out through the vent 39.

The pressure regulator or relief valve 32 is provided with a hand valve 41 for regulating the pressure supplied to the four-way valves 28 and 28a.

By manipulating the four-way valves, fluid pressure is delivered from the pressure lines 30 and 30a to one side of the pistons 18, and when the valve is turned in another position it connects the opposite side of the piston to the source of pressure. By manipulating the valve back and forth the tool heads are displaced from one side to the other of the pistons until all of the air is expelled and the cylinder is full of fluid. The four-way valve 28 is then set to apply the pressure through the gland 25 to the inside of the piston to effect displacement of the toolhead to move the cutter 10 in the direction of the work. The needle valves 29 and 29a are then slowly opened to relieve the pressure on the opposite side of the piston to cause displacement of the tool heads in their feeding movement. As shown in Fig. 1, the four-way valves 28 and 28a are also connected to drain lines 42 and 43.

By interconnecting the four-way valve in the manner shown in Fig. 1, there will be no cutting action of the tools 10 and 11 until the pressure is balanced on both sides of the roll. In other words, if the tool 10 of the cutting head 17 has advanced to contact the work, and the tool of the cutting head 17a has not made contact with the roll, there will be no feeding pressure on the cutter 10 until the cutter 11 has made contact, and the pressure is balanced on the pistons 18 and 18a, at which time both tools start to cut with equal pressure at their cutting edges. However, either tool can be stopped by the needle valves 29 and 29a, leaving the other tool working independently, or even permitting the other tool to be reversed, without changing the feed rate of the tool that is cutting. The particular feeding pressure varies with the kind of material that is being worked upon, and varies with different grades of iron and steel or alloys.

The feeding may be accomplished in two ways: by controlling the pump pressure to that required for the cutting of a single tool, or by high pump pressure and controlled discharge pressure through the needle valves 29 and 29a, the initial pressure supplied by the pump being regulated by the pressure regulator valve 32 as previously explained. It is evident that by applying high pressure cutting on opposite sides of the work acted upon there will be no substantial pressure on the journal bearing on the lathe or on the center of the head stock of the lathe, and no appreciable increase in power for turning the work is required. Also, the double cutting action with heavy duty tools at a high rate of feeding materially increases the capacity of a turning lathe, which is important in the saving of cost of initial equipment and floor space.

Although one embodiment of the invention has been herein illustrated and described, it will be evident to those skilled in the art that various modifications may be made in the details of construction without departing from the principles herein set forth.

I claim:

Feed mechanism for multiple cutting tools comprising a slide, tool stocks mounted on said slide having tool heads, hydraulic means for feeding said tool heads in their cutting or reversing movements, said hydraulic means comprising pistons disposed in cylinder chambers of the tool heads having fluid connection from opposite sides of the piston to a valve, a valve for each of said pistons having a common connection to a source of pressure fluid and to a relief line or drain, needle valves interposed between said valves and tool head chambers to create a pressure differential on opposite sides of the pistons whereby a predetermined pressure may be applied to displace the tool heads, said valves being adapted to lock said tool heads in any position or to selectively subject them to feeding or reversing movement, said tool heads when connected to the common pressure source being subjected to balanced pressure to provide equal and uniform cutting action, manual operating means for said tool heads for feeding the tools under pressure of the fluid independently of said hydraulic feed means and means for effecting micrometric adjustment for the feeding distance of the tool heads which consists of a micrometer adjustably mounted to the movable cylinder of the tool heads constituting a terminal of an electric circuit and a stop mounted on the slides of the tool heads constituting a second terminal of an electrical circuit for energizing a solenoid valve for cutting off the source of pressure fluid, and a solenoid for actuating said valve, said solenoid being connected to the electrical circuit controlled by the micrometer and stationary terminals.

References Cited in the file of this patent

UNITED STATES PATENTS

| | | |
|---|---|---|
| 245,934 | Blessing | Aug. 23, 1881 |
| 1,334,335 | Warren | Mar. 23, 1920 |
| 1,905,133 | Bishop et al. | Apr. 25, 1933 |
| 1,949,512 | Norton | Mar. 6, 1934 |
| 2,008,012 | Foster | July 16, 1935 |
| 2,108,353 | Svenson | Feb. 15, 1938 |
| 2,118,020 | Curtis | May 17, 1938 |
| 2,246,461 | Cannon | June 17, 1941 |
| 2,338,125 | May | Jan. 4, 1944 |
| 2,544,749 | Cowie | Mar. 13, 1951 |